United States Patent [19]

Chiang

[11] 4,215,302
[45] Jul. 29, 1980

[54] CONTROL SYSTEM FOR STEPPING MOTORS, A METHOD OF OPERATING STEPPING MOTORS, AND A METHOD FOR SELECTING CURRENT PATTERNS FOR STEPPING MOTORS

[75] Inventor: David Chiang, Dix Hills, N.Y.

[73] Assignee: MCC Associates, Ronkonkoma, N.Y.

[21] Appl. No.: 872,656

[22] Filed: Jan. 26, 1978

[51] Int. Cl.$^2$ ............................................. H02K 37/00
[52] U.S. Cl. ...................................................... 318/696
[58] Field of Search ................................ 318/685, 696

[56] References Cited

U.S. PATENT DOCUMENTS

| | | | |
|---|---|---|---|
| 3,328,658 | 6/1967 | Thompson | 318/696 |
| 3,374,410 | 3/1968 | Cronquist et al. | 318/685 |
| 3,579,279 | 5/1971 | Inaba et al. | 318/696 |
| 3,787,727 | 1/1974 | McSparran | 318/696 |
| 3,812,414 | 5/1974 | Abraham et al. | 318/696 |
| 3,818,261 | 6/1974 | Clark, Jr. | 318/696 |
| 3,904,858 | 9/1975 | Rosshirt | 318/696 X |
| 3,947,742 | 3/1976 | Van Acker | 318/696 X |
| 3,986,094 | 10/1976 | Quioque et al. | 318/685 X |
| 4,009,428 | 2/1977 | Sawyer | 318/696 X |
| 4,029,977 | 6/1977 | Chai et al. | 318/696 X |

*Primary Examiner*—Gene Z. Rubinson
*Attorney, Agent, or Firm*—Posnack, Roberts, Cohen & Spiecens

[57] ABSTRACT

An open loop control device and method are provided for stepping motors. By energizing a motor so that the rotor motion is the result of a revolving field which is of piecewise constant speed and uniform field strength, the rotor can be brought to a stop at any desired position. Such position can be the same as or different from the conventional full-increment or half-increment detent positions of the motor. This control method and device guarantee that there is no oscillation when the rotor reaches its final position. The field windings are energized in sequential manner and such that the resultant field takes into account the magnetic characteristics of the motor. The revolving field can be initially adapted to produce, in one case, an angular velocity of half the desired speed for purposes of accelerating the rotor. After one-half of a resonant period has elapsed, the rotor is accelerated to the desired speed. At this time, the speed of the field is doubled and the rotor fully synchronized therewith. When the rotor is to be stopped, the field velocity is switched to an angular velocity equivalent to that of the acceleration velocity which is half the constant speed velocity and the rotor therefore overshoots. Half of a resonant time period later, the rotating field is stopped and the rotor comes to a standstill without oscillation since the field is precisely aligned with the rotor at the instant of stopping. Also, a method is provided for establishing current forms or patterns for the windings of a multi-phase stepping motor to provide the uniform revolving field taking into account the magnetic characteristics of the motor. This method comprises, for each of the pairs of windings which are sequentially effective to drive the rotor of the stepping motor, the steps of driving one winding of the pair with maximum running current and measuring rotor stiffness at the resultant detent position, and thereafter passing a relatively small current through the other winding of the pair and reducing the current through the first winding to displace the rotor to a position which is a fraction of a distance towards the next detent position. These two currents are adjusted to obtain a rotor stiffness equal to the first rotor stiffness while maintaining rotor position. Subsequent steps involve sequentially displacing the rotor and repeating the process to obtain a current curve which will generate the aforesaid revolving field with constant velocity and uniform strength despite magnetic characteristics of the components of the stepping motor involved.

20 Claims, 19 Drawing Figures

ONE-STEP ACCELERATION
AND DECELERATION

---- FIELD POSITION
—— ROTOR POSITION

---- FIELD VELOCITY
—— ROTOR VELOCITY

ONE-STEP ACCELERATION AND DECELERATION

---- FIELD POSITION
—— ROTOR POSITION

---- FIELD VELOCITY
—— ROTOR VELOCITY

TWO-STEP ACCELERATION AND DECELERATION

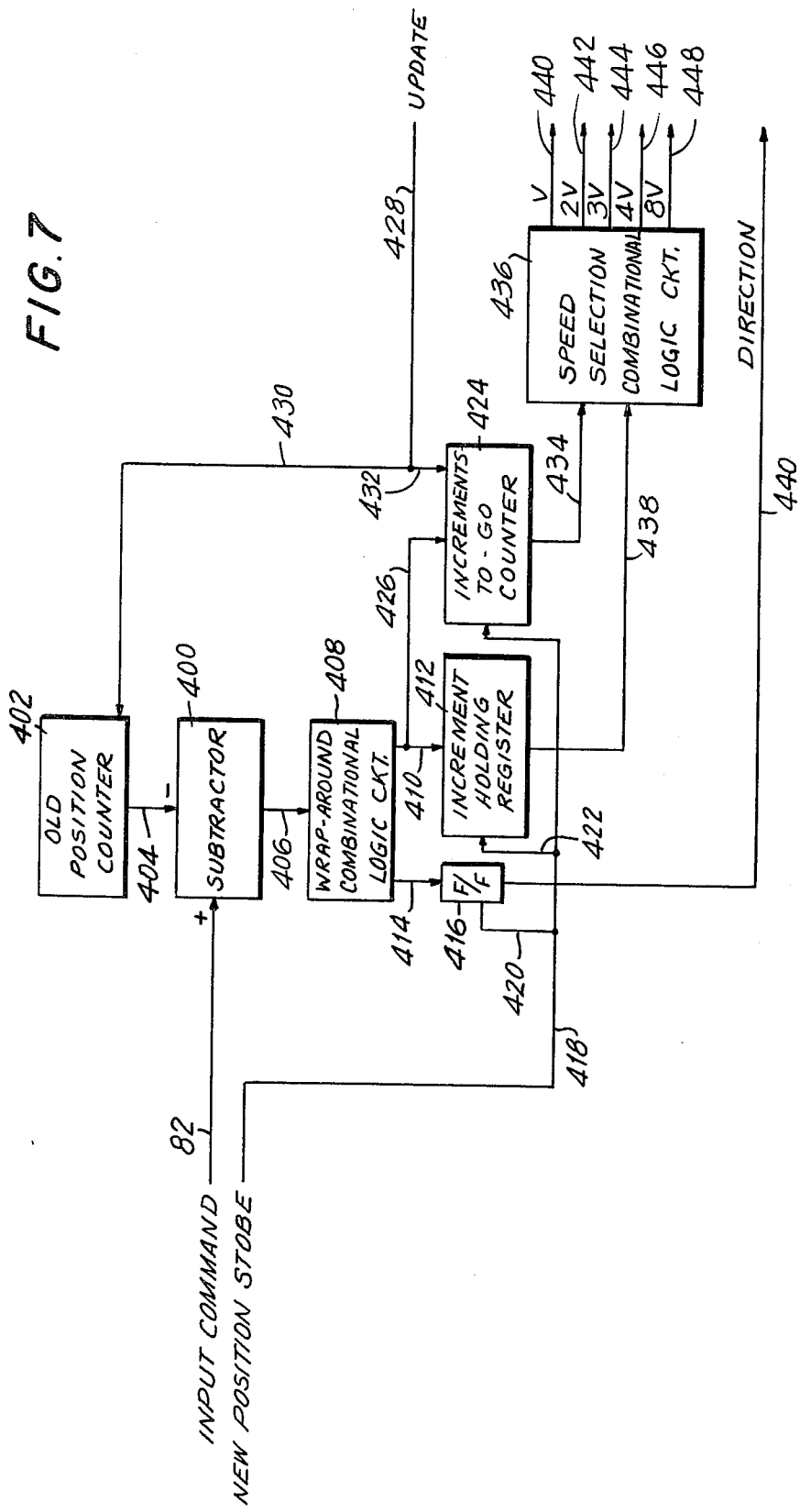

CONTROL SYSTEM FOR STEPPING MOTORS, A METHOD OF OPERATING STEPPING MOTORS, AND A METHOD FOR SELECTING CURRENT PATTERNS FOR STEPPING MOTORS

FIELD OF INVENTION

This invention relates to stepping motor controllers (including open-loop controllers), to methods for operating stepping motors, and to methods for determining current forms or patterns for application to the windings of stepping motors in order to achieve desired results despite differences in magnetic and torque characteristics as might exist between stepping motors of different designs or stepping motors of the same design but different characteristics to the core materials thereof.

BACKGROUND

A stepping motor may fall into different categories such as permament-magnet (PM) and variable-reluctance (VR) types. When incremental output motion is desired, stepping motors provide a logical link between digital information and mechanical translation. For some time, these stepping motors (both the permanent magnet and variable reluctance types) have been used as output devices for various kinds of incremental-motion control systems. In fact, the importance of stepping motors has become even more prominent since control commands are currently being provided more frequently in digital form.

For many situations, the system load consists mainly of an inertia load, with or without a moderate amount of friction. The system requirement most often sought after is that, given a digital command, the load must be moved to a new position within minimum time and without overshoot since overshoot invariably leads to oscillation or hunting. This problem is frequently encountered in the design of modern computer peripherals. For example, in the case of a high-speed single-element serial incremental printer, the printing head has to be positioned at very high speed and with great accuracy.

To understand a fundamental problem inherent in the operation of a stepping motor, it is necessary to understand some features of the construction and operation of a stepping motor. More particularly, a stepping motor includes a rotor which cooperates with stator windings. Provision is made for energizing one or more sets of the stator windings so that the stepping motor can be "detented" in the sense that its rotor moves to a position at which the vector sum of the torques created by the stator fields is zero. In the case of permanent magnet types, this means that the rotor field is aligned with the stator field. For variable reluctance types, this means that the magnetic path of the stator-generated flux is of minimum reluctance.

If the first actuated set of windings is de-energized and the adjacent set is next energized, the rotor will tend to move towards the neighboring detent position. If continuous motion is desired, the windings are switched on sequentially so that there is a "revolving" or mobile field which moves in discrete steps.

At low switching speeds, the rotor follows the field in a go-stop manner with some oscillation or hunting every time it comes to a stop. At high switching speeds, the movement of the rotor will change from discrete motion to a continuous forward motion often referred to as "slew". Since subsequent switching pulses arrive when the motor is running at a different velocity, the performance of the motor becomes unpredictable. This gives a qualitative description of an industry-wide problem which tends to limit the use of stepping motors.

Although the stepping motor is inherently suited for driving loads in an incremental fashion, it is plagued, in practical applications, by the following difficulties:
 (1) high speed and satisfactory resolution cannot be attained simultaneously;
 (2) the presence of oscillation or hunting after the rotor has reached a destination; and
 (3) the possibility of loss of synchronization during high speed running.

The first difficulty listed above has not been solved by any other method. For example, a 15°/step 720 step/sec. motor can run at 1800 rpm but cannot have a resolution of 1.8°/step. On the other hand, a 1.8°/step motor must run at 6000 step/sec. to achieve 1800 rpm. Gear reduction, aside from its cost, can improve resolution, but must sacrifice maximum speed.

The second difficulty listed above has been alleviated to some extent by various kinds of damping techniques. Among these techniques is mechanical damping which suffers from an accompanying loss of motor performance in addition to high cost. Electronic or switching damping techniques which are also known sometimes give satisfactory results, but are extremely difficult to implement. For example, a so-called delayed-last-step technique is applicable only if overshoot consistently approaches 100% of the stepping angle. On the other hand, a so-called back phasing (bang-bang) damping technique works only if the terminal velocity is known each time the motor stops. In general, it can therefore be stated that, with the present state of art, most incremental control systems have to be compromised in performance to some extent due to inadequate damping.

The third difficulty listed above has been resolved by adding an "encoder" to the associated control circuit. The encoder senses the position and/or the speed of the rotor and then sends this information to the motor control circuit. Sensing the difference between what is desired and what is actually attained, the control circuit takes corrective action. However, there is substantial increase in cost if an encoder (also known as closed-loop control) is employed.

In the field of stepping motor controls, there will be found a wide variety of patents, as will be shown hereinafter. However, these patents fail to reveal the principal features of the present invention. Some of the patents which have been located will next be discussed for purposes of establishing a further environment for the disclosure which follows hereinafter.

S. Inaba in U.S. Pat. No. 3,579,279 deals with the problem of "loss of synchronization" when a stepping command changes abruptly. The circuit smooths out the rapid changes so that a sudden start or stop is prevented from occurring. The object of the control provided in this patent is to avoid extremely large overshoots which might bring the rotor out of synchronization with a command. This technique blindly slows down the clock during deceleration. The motion of the rotor can only be expected to follow the command faithfully without erroneous movements. As for sub-step oscillation elimination, the method is completely ineffective. This control is aimed at controlling the motor when large multi-revolution distances are to be travelled. For incremental motions which are only a few steps or a fraction of a step, this technique is totally inapplicable.

Along the same lines, C. J. Clark, Jr. in U.S. Pat. No. 3,818,261 discloses a technique and apparatus which is essentially the same as the Inaba apparatus.

K. E. Hendrickson in U.S. Pat. No. 3,732,480 discloses driving a stepping motor with variable width pulses. The width of each pulse is predetermined by solving a set of simultaneous motion equations with the use of digital computers. The physical implementation consists of a time base generator whose output voltage is constantly compared with a set of preset constant voltages. Whenever a coincidence occurs, a new pulse is sent to the motor winding. This technique attempts to control the motion by frequency means. This, in itself, distinguishes from the present invention. According to the example described in the Hendrickson patent, the reference voltage resolution requires three digits. This means that the technique is difficult to apply without costly labor. Furthermore, the disclosure states that the assumption of constant inductance is not valid when winding current approaches its rated value. This means that the motor cannot be driven at its full capacity and therefore performance deteriorates.

R. A. McSparran in U.S. Pat. No. 3,787,727 takes into account the following control techniques in half-step operation: (a) acceleration period can be reduced by temporarily increasing the winding currents and (b) overshoot can be reduced by slowing down on the driving clock. Since torque characteristics are quite difficult when a stepping motor is driven to full step or half step, two steps of start and stop control are used to compensate for the difference. The clock rate is governed by the position feedback signal. Although, this technique uses two levels of voltage for motor windings, it involves essentially a digital drive and has nothing to do with the instant invention.

B. Sawyer in U.S. Pat. No. 4,009,428 reveals and attempts to achieve a trapezoidal velocity profile. This, in itself, distinguishes from the instant invention. Further, this patent assumes the motor to be an idealized A.C. synchronous motor. This further distinguishes from the instant invention. Sawyer, to achieve a burst of constant acceleration, provides that the revolving field must lead the motor by a constant angle. This means that the frequency of the driving clock must vary continuously with time during acceleration and deceleration. To this end, the Sawyer circuit incorporates a ramp generator and a variable frequency pulse generator. The Sawyer circuit is thus completely different from the circuit of the instant invention which uses a constant and switchable clock to drive a digital-to-analog converter. Furthermore, the lack of physical characterization of the motor inevitably leads to accuracy problems in the Sawyer solution. In other words, since the motor torque depends on the physical construction and the saturation properties of the magnetic material, a simple set of sine-cosine currents proposed in accordance with this patent will not produce the desired constant acceleration and deceleration in actual applications.

L. Thompson in U.S. Pat. No. 3,328,658 discloses a method typically known as bang-bang control as discussed hereinabove. The difficulty with this method is that the timing of the braking pulse must depend upon the terminal velocity of the rotor as well as the lead angle immediately before braking is applied.

SUMMARY OF INVENTION

It is an object of the present invention to provide for improved open-loop control of stepping motors and the like.

Another object of the invention is to provide improved methods of operating stepping motors and the like.

Yet another object of the invention is to provide an improved method for determining current patterns to be used in the field windings of stepping motors and the like to take into account magnetic characteristics and the like.

It is still another object of this invention to eliminate certain problems so that low-cost open-loop motion controls using stepping motors can compete with the more sophisticated closed-loop systems using either stepping motors or D.C. servo motors as output devices.

Departing from traditional approaches, this invention introduces a unique method of open-loop control. The uniqueness of this control technique resides at least partially in a feature whereby the stepping motor does not have to be driven digitally. More particularly, taking into account that a stator magnetic field is usually generated by a combination of winding currents, these currents are tailored such that the resultant field moves in a piecewise constant-speed fashion instead of in conventional discrete steps. The advantages of this technique will be fully explained hereinafter.

Still another object of the invention is to provide for the designing of a low-cost printer or the like with high printing quality such as, for example, a serial impact printer whose printing element is free from oscillation at the instant of printing.

Yet another object of the invention is to avoid the deficiencies of closed-loop types of controls heretofore employed for stepping motors and the like.

Still another object of the invention is to provide a novel technique for the determination of current patterns or curves which take into account the BH characteristics of the components of the motor in question.

In achieving the above and other objects of the invention, there is provided an apparatus comprising a stepping motor including a rotor, a stator and windings associated with the stator to generate a revolving stator field to drive said rotor; a mechanical load on said rotor; means to supply currents to said windings so that said rotor is driven in such a manner that the load can be stopped at any desired position without oscillation and with no loss of synchronization during high speed run.

According to a feature of the invention, the aforesaid means include means to supply said currents such that a rotating field is generated with constant but switchable velocity.

According to still a further feature of the invention, the currents may have the form of a curve with a shape which relates to the magnetic characteristics of the stepping motor. More specifically, in accordance with a preferred embodiment of the invention, the curve may be bell-shaped.

In further accordance with the invention, the aforesaid rotor follows the stator field in a deterministic manner; i.e., under the condition that the stator field is of uniform strength and constant velocity, the rotor moves back and forth relative to the field with a fixed resonant period. Therefore, at every half of said resonant period, the rotor coincides with the revolving stator field.

According to yet another feature of the invention, there is provided means to supply current at a plurality of sequential constant magnitudes for bringing the rotor up to constant speed in synchronization with the revolving stator field.

As will be apparent hereinafter, the load may, for example, be an I.B.M. typeball, a daisy shaped printwheel or the like. The invention is, however, suitable for a wide variety of mechanical loads including those which are linearly displaceable as well as those displaceable in a rotary manner.

Yet another feature of the invention relates to the provision of storage means for storing a plurality of current patterns and selection means to release the patterns selectively into the windings for generating the revolving field.

In accordance with another aspect of the invention, there is provided apparatus for driving a load controllably to selected of a plurality of sequentially arranged positions, said apparatus comprising magnetically coupled driving and driven members whereof said driven members are adapted to drive said load, and means to generate a mobile magnetic field in said driving member to drive said driven member, said driven member having inertia when commencing movement from standstill at a first of said positions to standstill at a second of said positions, and means generating said mobile field at an acceleration velocity for the acceleration of the driven member from standstill at said first position to a constant travel velocity and switching said mobile field to a constant travel velocity corresponding to the constant travel velocity of the driven member in synchronization therewith.

In accordance with yet another aspect of the invention, said means may generate said mobile field at a deceleration velocity for the deceleration of the driven member to standstill at said second position, said deceleration velocity being constant and terminating such that the mobile field and driven member come to a standstill, with the driven member at said second position, simultaneously. Preferably, halfway through said deceleration velocity, said driven member has a velocity corresponding to the deceleration velocity. In the aforesaid, note has been taken of the generation of a single acceleration velocity. However, it is to be understood that provision may be made for a plurality of acceleration velocities, each of a different magnitude but of a like period, leading in equal steps to the maximum velocity and such that the revolving field and driven member reach the maximum velocity in synchronization.

In accordance with a further feature of the invention, the aforesaid means may include electrical-current-pattern storage means coupled to the aforesaid windings to generate the mobile field velocities and selection means coupled to said storage means.

In accordance with another aspect of the invention, a method is provided for establishing current forms or patterns for windings of a multi-phase stepping motor, having a rotor and characterized by a plurality of detent positions, to provide a uniform strength revolving field with constant velocity, said windings being operative in sequentially effective pairs to control the rotor of the motor. Said method comprises, for each of said pairs, driving one winding of the pair with maximum running current and measuring rotor stiffness at the resultant detent position, next passing a relatively small current through the other winding of the pair and reducing the current through said one winding to displace said rotor to a fraction of the distance towards the next detent position, adjusting the latter two said currents to obtain a rotor stiffness equal to the first said rotor stiffness while maintaining rotor position, and sequentially displacing the rotor in steps towards the next detent position by changing the currents through the windings of the pair while adjusting the currents to maintain rotor position and stiffness. The magnitudes of the thusly adjusted currents define current curves for the windings to provide a uniform strength revolving field with a constant velocity.

According to a further aspect of this method, it is possible to discontinue displacement of the rotor and adjustment of the currents in the windings of the pair when the adjusted currents are equal to each other and to form curves of the adjusted current magnitudes with each curve being continued by the mirror image of the other curve.

Yet another aspect of this method involves that the rotor stiffness is determined by measuring the average torque required to displace the rotor from its detent position over a selected range. This range may differ from application to application. In the preferred embodiment, this range is set to be in the order of seven-tenths of the distance between two adjacent detent positions.

In viewing the invention from another aspect, provision is made of apparatus comprising a stepping motor including a stator, a rotor, and windings on said stator to drive said rotor through a plurality of detent positions. These detent positions are not necessarily the same as the conventional full-step or half-step detent positions. A storage means is provided to store current patterns in digital form so that during motor motion data can be sequentially fetched from the storage by a timing clock. These fetched data are converted into electric current to drive the motor. Since the aforesaid revolving field is a direct result of the motor current, its velocity is directly controlled by the timing clock mentioned above. A selection means is provided for selecting the clock rate and, therefore, the velocity of the revolving field.

According to this aspect of the invention, the storage means includes a memory for each pair of windings, said memory storing the aforesaid current patterns. Furthermore, the selection means may comprise means for generating addresses to release selected patterns from said memory. Said selection means may in addition include a variable clock generator and a counter coupled to said clock generator for generating addresses.

Still further, the selection may include a first position indicator for indicating the rotor position last occupied, a second position indicator for indicating rotor position desired, and subtractor means coupled to said indicators for indicating the number of detent positions between the last occupied and the desired rotor positions.

A rotary load may be coupled to the aforesaid rotor and, the selection means may include a wrap-around combinational logic means coupled to said subtractor means to calculate the minimum number of detent positions between the last occupied and desired rotor positions. The selection means may include speed selection combinational means responsive to said subtractor means to control said means for generating addresses and said variable clock generator.

In the aforesaid apparatus, the patterns may be formed as described hereinabove. Furthermore, there may be provided in accordance with the invention a method which comprises driving a rotor of a stepping motor from standstill at a first position to standstill at a second position by driving the same at least between acceleration and deceleration periods with revolving field of constant maximum velocity and adapted for exerting anti-friction torque on the rotor.

This latter method may be further considered as comprising accelerating the rotor from standstill at said first position with n periods of revolving field with respectively uniform strengths and constant angular velocities, wherein n is an integer at least equal to one, and in the case of n=1 the rotor angular velocity equals twice the field angular velocity at the end of the corresponding period. By doubling the field velocity at this very instant, the rotor and field achieve said constant maximum velocity simultaneously and in synchronization.

The method may further comprise decelerating the rotor from said constant maximum velocity to standstill at said second position with n periods of revolving field with respectively uniform strengths and constant angular velocities, wherein n is an integer at least equal to one, and in the case of n=1 the rotor angular velocity equals zero at the end of the corresponding period. By stopping the revolving field at this very instant, the rotor and field achieve standstill at said second position simultaneously to avoid oscillation.

The above and further objects, features and advantages of the invention will become apparent from the detailed description of a preferred embodiment which follows hereinafter and is illustrated in the accompanying drawing.

BRIEF DESCRIPTION OF DRAWING

In the drawing:

FIG. 5A-1 is a chart illustrating field position against rotor position for one-step acceleration and deceleration;

FIG. 5A-2 is a chart illustrating field velocity against rotor velocity for one-step acceleration and deceleration;

FIG. 5B-1 is a chart illustrating field and rotor positions for two-step accelerating and decelerating;

FIG. 5B-2 is a chart illustrating field and rotor velocities for two-step acceleration and deceleration;

FIG. 7 is a block diagram illustrating the details of one of the blocks in FIG. 6;

DETAILED DESCRIPTION

Figure 1:
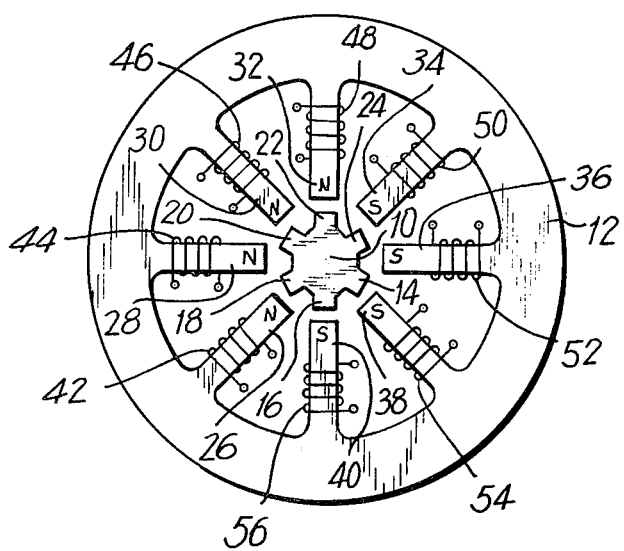
FIG. 1 is a diagrammatic view of a stepping motor which can be controlled in accordance with the principles of the invention.

A four-phase 15°-per-step variable-reluctance motor is shown in FIG. 1. It is used as an example with the understanding that the following step-by-step development is applicable to stepping motors of permanent-magnet and variable-reluctance types. Also, the following development is independent of the number of phases and stepping angles of the motor involved.

The illustrated motor conventionally includes a rotor 10 in operative association with a stator 12. The rotor has a plurality of teeth 14,16,18,20,22 and 24. The stator has a plurality of poles 26,28,30,32,34,36,38 and 40 which are divided into north and south poles. On these poles are provided respective windings 42,44,46,48,50,52, 54 and 56. The arrangement is such that alignment is possible only between a limited number of teeth and poles at a given time. In the illustrated example, tooth 22 is aligned with pole 32 and tooth 16 is aligned with pole 40. As rotor 10 rotates, other combinations come into alignment.

Figure 2:
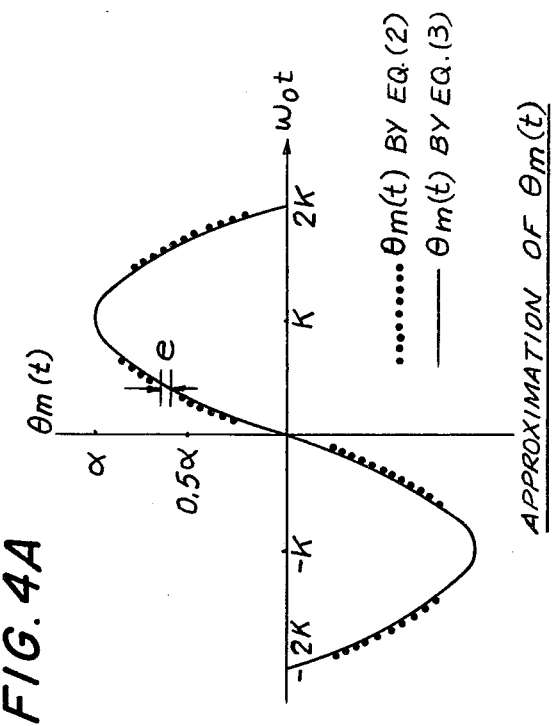
FIG. 2 is a chart illustrating a typical static torque characteristic.

Using appropriate mathematical models with respect to static torque characteristics, it can be shown that the static torque is approximately a sinusoidal function of the rotor displacement when one set of windings is energized (FIG. 2). This result is well known and has been verified for both permanent-magnet and variable-reluctance motors. Thus:

$$\tau = \tau_{max} \sin\theta$$

wherein:
$\tau_{max}$ is the detent or holding torque and is a function of the winding current.
$\theta_e$ is an electrical angle defined by $\theta_e = N_R \theta_m$, wherein:
$N_R$ is the number of rotor teeth
$\theta_m$ is the angle between the rotor and its detent position.

If two adjacent phases A and B arre energized with current $I_A$ AND $I_B$, the resultant torque is $$\tau = -\tau_A \sin\theta_e - \tau_B \sin(\theta_e + 90°) \qquad (1)$$
$$= -\sqrt{\tau_A^2 + \tau_B^2} \sin(\theta_e + \arctan\tau_B/\tau_A)$$

Thus, the excitation of two phases results in shift in the detent position and an increase in holding torque. However, the torque remains a sinusoidal function of rotor displacement.

A stepping motor with a stepping angle $\theta_o$ is next considered with respect to the oscillation characteristic of its rotor. If the rotor is forced to move away from its detent position by $\alpha$ degrees, $\alpha \leq \theta_o$, and then released, since the restoring torque is a sinusoidal function of $\theta_m$, the rotor oscillates in exactly the same manner as that of a pendulum.* Neglecting friction, it follows that:

$$\theta_m(t) = 2\arcsin(\sin\alpha/2 \text{ sn } \omega_o t) \qquad (2)$$

wherein: $\omega_o = 2\pi f_o$, in which $f_o$ is the small angle resonant frequency. 6 *For example, see Frank Bowman "Introduction to Elliptic Functions", page 27, Dover, 1961 sn u denotes the elliptic function of u
i.e., if $x = \text{sn } u$ then $$u = \int_0^x \frac{dt}{\sqrt{(1-t^2)(1-k^2 t^2)}}$$

in which $k = \sin\alpha/2$ and is the modulus of the elliptic function

Eq. (2) describes the periodic motion of the rotor. The complete period T is given by $\omega_o T = 4K$. K is the definite integral $$K = \int_0^1 \frac{dt}{\sqrt{(1-t^2)(1-k^2 t^2)}}$$

An examination of Eq. (2) reveals that the motion of the rotor can be very closely approximated by $$\theta_m(t) = \alpha \sin(\pi/2K)\omega_o t \quad (3)$$

Eq. (3) is, of course, the equation for simple harmonic motion. The angular frequency has been decreased from $\omega_o t$ to $(\pi/2K)\omega_o$. The ratio $K/\frac{1}{2}\pi$ is plotted in FIG. 3. As expected, when $\alpha$ is small, Eq. (3) is exact. When $\alpha$ is no longer small, the error introduced by using Eq. (3) is shown in FIG. 4. It can be seen that the error is extremely small.

In all practical cases, the lead angle of the stepping motor (the angle between the rotor and the field) does not exceed one full step ($\alpha = \theta_o$). Therefore, the simple harmonic approach gives results accurate enough for all engineering purposes.

The next consideration is a uniform revolving field. It is assumed possible to energize the stator windings in a sequential manner so that the resultant field rotates in a manner similar to that of a polyphase A.C. induction motor. In addition to this, let it be assumed that:
(1) the field rotates at constant speed
(2) the field is of constant strength.

Under these circumstances, the inertia of the rotor and its load can be considered as being pulled by a spring while the other end of the spring moves along the circular path with constant speed. Since it has been shown that, if the displacement between the rotor and the field is small, the motion of the rotor is simple harmonic motion, it follows that the spring constant does not vary. Consequently, it becomes simple to obtain the expression for the rotor motion.

Let it be assumed that at $t=0$, the rotor position coincides with the field and moves with initial velocity $\omega_1$ steps per second. The field moves with constant velocity $\omega_2$ which could be smaller or greater than $\omega_1$, i.e.

Figure 3:
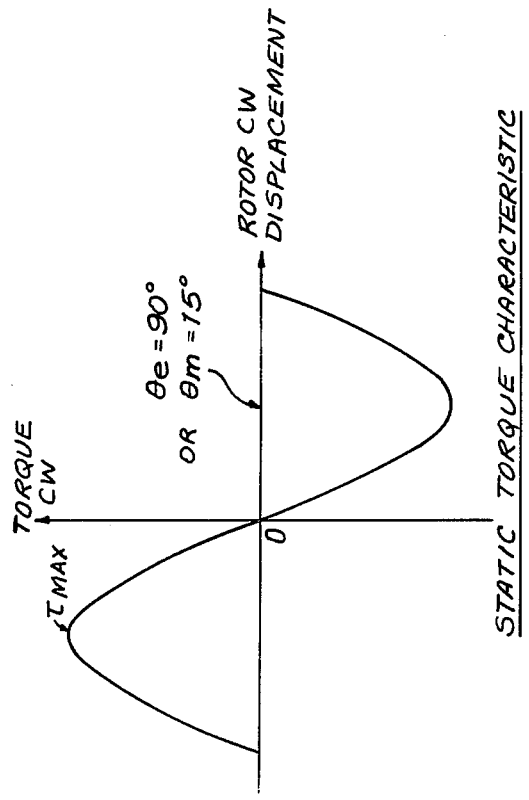
FIG. 3 is a chart illustrating oscillation period versus amplitude.
Figure 4A:
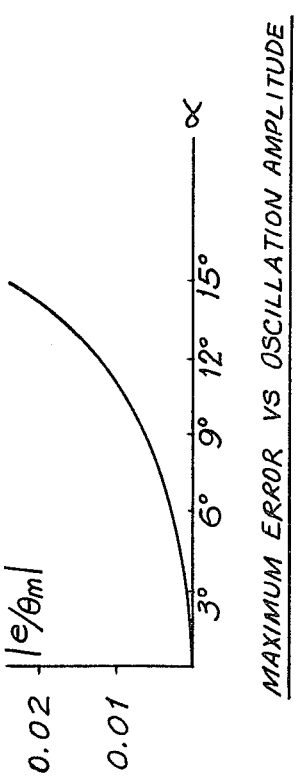
FIG. 4A is a chart illustrating characteristics according to equations in the detailed description.
Figure 4B:
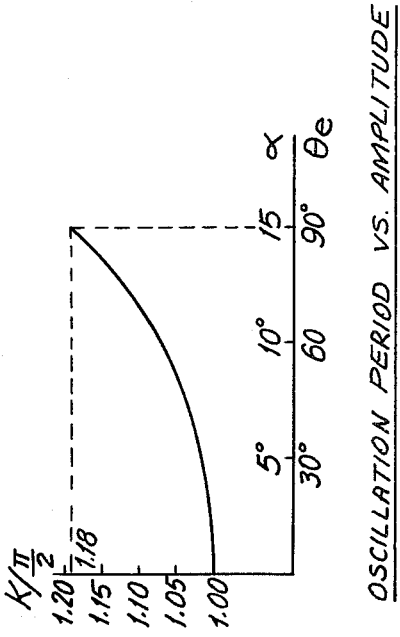
FIG. 4B is a chart illustrating maximum error versus oscillation amplitude.

$\theta_r(0) = 0 \quad \dot\theta_r(0) = \omega_1$
$\theta_f(0) = 0 \quad \theta_f(t) = \theta_2$ The solution of the following motion equation $$\ddot\theta_r(t) + \Omega_o^2 [\theta_r(t) - \theta_f(t)] = 0$$

is $$\theta_r(t) = \frac{\omega_1 - \omega_2}{\Omega_o} \sin\Omega_o t + \omega_2 t \quad (4)$$

where $\Omega_o = 2\pi f_o(\pi/\frac{1}{2}K)$, is the large (but still smaller than full step) angle oscillation frequncy in units of radians/sec. and the ratio $2K/\pi$ is shown in FIG. 3.

The first term on the right hand side of Eq. (4) is oscillatory and the second term is simply the expression for field motion $\theta_f(t)$. Thus, the rotor "follows" the stator field but oscillates about its equilibrium position. The amplitude of the oscillation is $(\omega_1 - \omega_2)/\Omega_o$ steps. To keep this amplitude within one full step one must have $$|\omega_1 - \omega_2''| < \Omega. \quad (4A)$$

Differentiating Eq. (4) with respect to t, $$\dot\theta_r(t) = (\omega_1 - \omega_2)\cos\Omega_o t + \omega_2 \quad (5)$$

at $t = \pi/\Omega_o$, the rotor position and velocity are, respectively $$\theta_r(\pi/\Omega_o) = \theta_f(\pi/\Omega_o) = \pi\Omega_2/\omega_o \quad (6)$$

$$\dot\theta_r(\pi/\Omega_o) = 2\omega_2 - \omega_1 \quad (7)$$

Thus, at the half way point of the resonant cycle, the rotor not only coincides with the field, but also has undergone a speed change from $\omega_1$ to $2\omega_2 - \omega_1$ (net change $= 2(\omega_2 - \omega_1)$).

Half Wave Start-Stop Control Method

Figures 1, 5A:
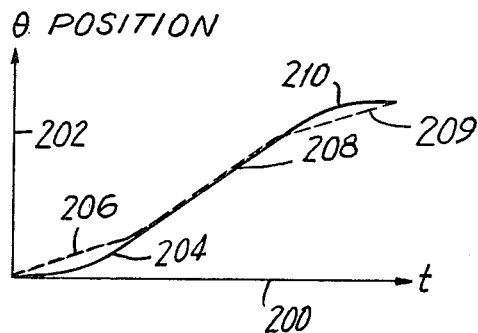
Figures 2, 5A:
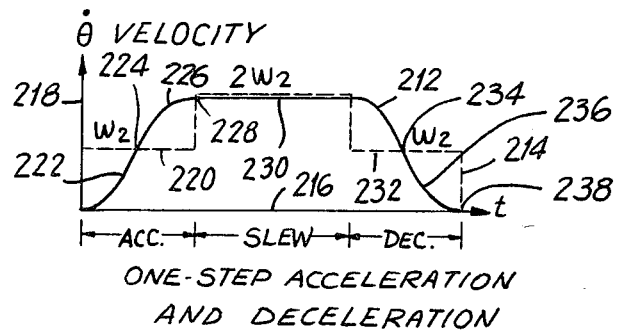

To accelerate a stepping motor from stand still, there is applied a revolving field of $\omega_2$ steps per second, $\omega_2 < \Omega_o$. At the end of half of the resonant period $t = \pi/\Omega_o$, the rotor speed will be $2\omega_2(\omega_1 = 0$ in Eq. (7)). Now if the field speed is switched from $\omega_2$ to $2\omega_2$ at this very instant, the rotor will be "locked in" or synchronized by the field and a constant speed motion results. During this constant speed motion, the rotor may lag the field by a small angle so that energy can be supplied to compensate for the friction loss. At the end of constant speed motion, the field velocity is switched back to $\omega_2$ so that rotor now overshoots. Again, half a resonant period later, the rotor comes to a complete stop ($\omega_1 = 2\omega_2$ in Eq. (7)). However, since the field is aligned with the rotor at this moment, the field can be stopped from revolving and an oscillator-free incremental motion is achieved. FIG. 5A shows the single step acceleration-deceleration motion characteristic.

Figures 1, 5B:
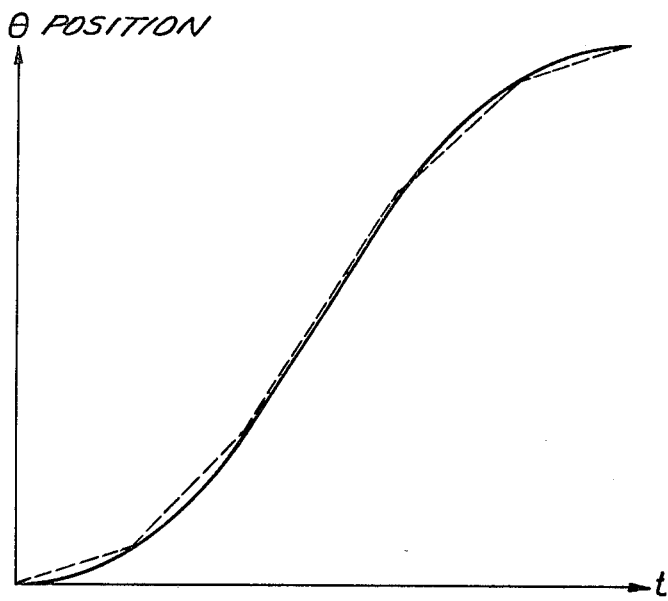
Figures 2, 5B:
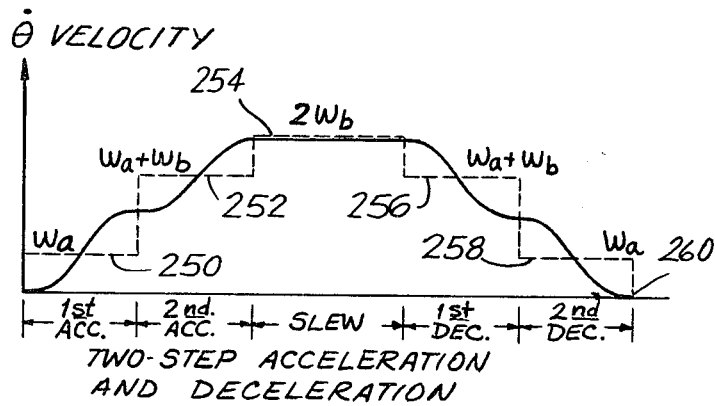

If the desired maximum speed is greater than $\Omega_o$ then controlled acceleration cannot be accomplished in a single half period. Instead, the rotor must be accelerated one step per half period. In other words, the rotor will be accelerated from 0 to $2\omega_a$ during the first half period (stator field speed $=\omega_a$) and then from $2\omega_a$ to $2\omega_b$ during the second half period (stator field speed $=\omega_a + \omega_b$) and so forth. Naturally, the deceleration must be made in the same step-by-step fashion. FIG. 5B shows the characteristic of a two-step acceleration-deceleration.

It is now clear that to achieve complete control of the rotor motion, a revolving stator field must have the following properties:
(1) Constant but switchable (piecewise constant) velocity
(2) Constant stiffness or torque sensitivity $\tau/\theta, \theta$ being the angle between field and rotor (in other words, for equal displacements between the field and rotor, equal restoring torques will be applied by the respective magnetic fields).

Figure 6:
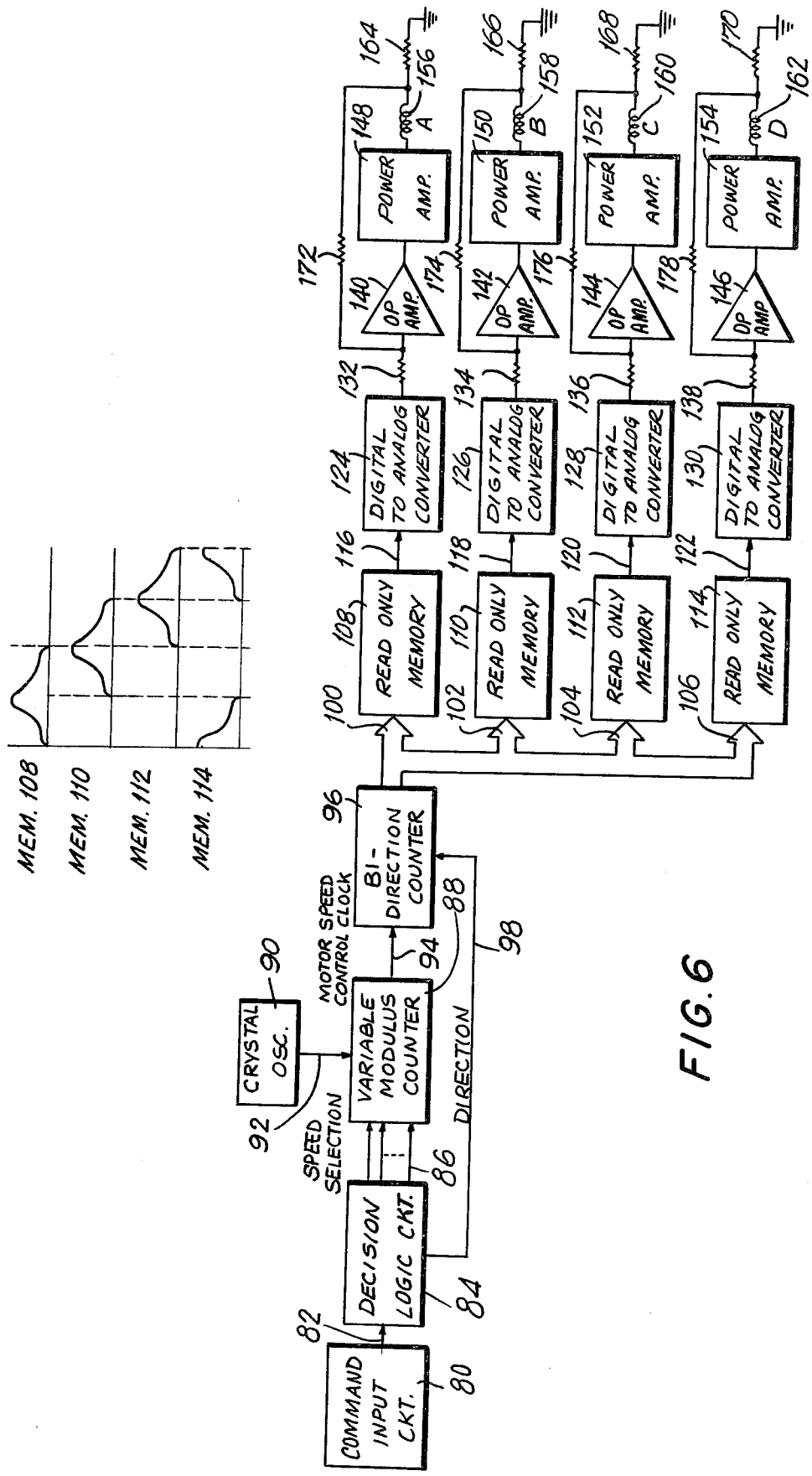
FIG. 6 is a block diagram of a control circuit for implementing the control of a stepping motor in accordance with one embodiment of the invention.
Figure 8A:
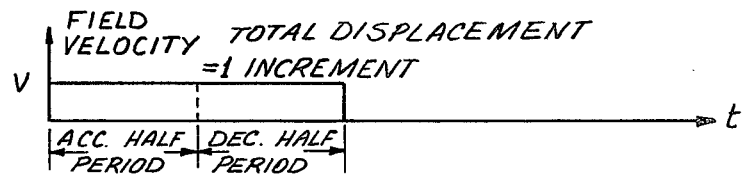
FIGS. 8A–8E are respectively charts illustrating desired field velocity.
Figure 8B:
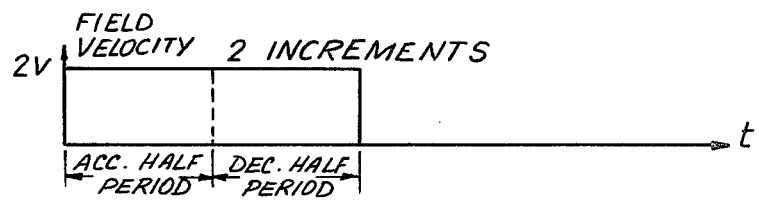
Figure 8C:
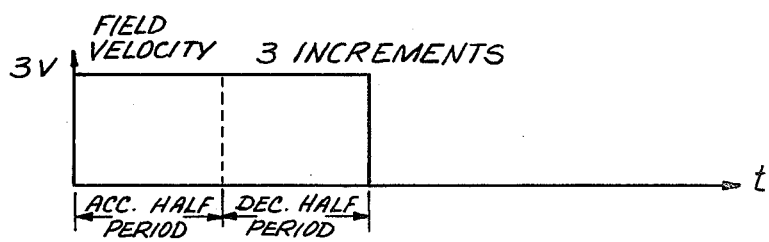
Figure 8D:
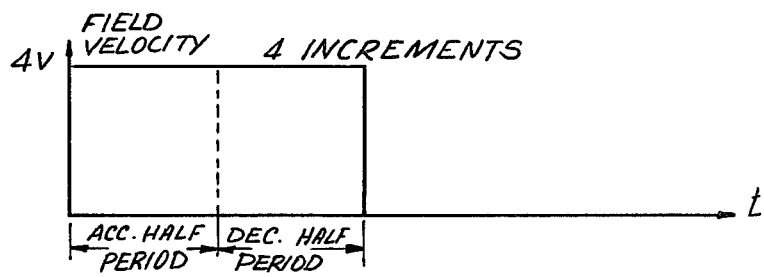
Figure 8E:
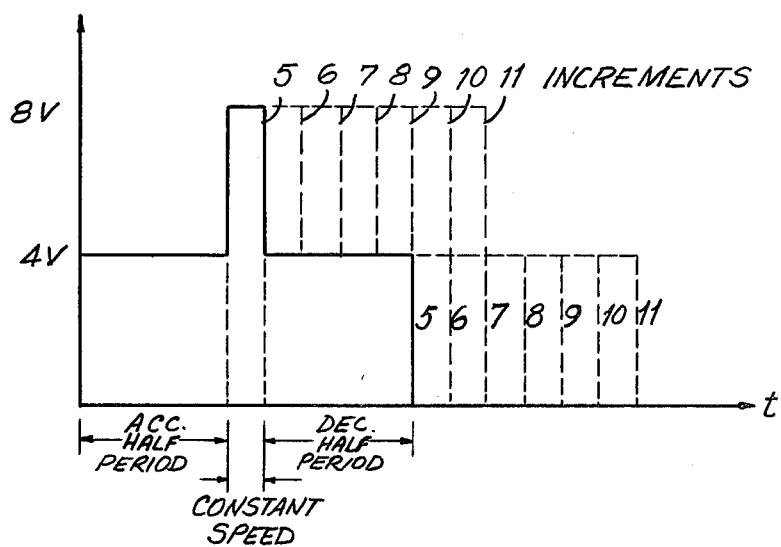

An implementation of the above is shown in FIG. 6. The circuitry illustrated in FIG. 6 involves a command input from a command input circuit 80 which may be for example the output of a computer or from any storage device or the like capable of giving signals to control a stepping motor or the like. This command input circuit is connected via line 82 to a decision logic circuit 84 connected via lines 86 to a variable modulus counter 88. A crystal oscillator 90 is provided which is connected via line 92 to counter 88. The counter 88 is connected via line 94 to a bi-directional counter 96 which also receives an input signal via line 98 from decision logic circuit 84. The details of decision logic circuit 84 will be discussed hereinafter with reference to FIG. 7.

Counter 96 feeds signals or addresses via lines 100, 102, 104 and 106 to read-only-memories 108, 110, 112, and 114. These in turn are connected via lines 116, 118, 120, and 122 to digital-to-analog converters 124, 126, 128 and 130.

The digital-to-analog converters are connected via resistors 132, 134, 136 and 138 to op amps 140, 142, 144 and 146 in turn connected to power amplifiers 148, 150, 152 and 154. The power amplifiers 148, 150, 152 and 154 are respectively connected to windings 156, 158, 160 and 162 which represent the four phases of a stepping motor. The number of phases is selected for illustrative purposes only and is in no way limiting of the invention.

Resistors 164, 166, 168, 170 are sensing resistors connected between the aforesaid windings and ground and they operate in conjunction with resistors 172, 174, 176 and 180 connected in feedback relationship to the aforementioned op amplifiers 140, 142, 144 and 146.

The input command which contains the information of next desired motor shaft position is fed into the decision logic circuit 84. The decision logic always keeps the current shaft position in storage. Therefore, decision can be made as to which direction the motor should turn and what velocity profile it should have.

Once the desired (rotor) velocity profile has been chosen, the stator field velocity can be readily determined (from FIG. 5A or 5B). The decision logic thus outputs a command signal (velocity selection) which directs the variable-modulus counter 88 to generate a clock at the desired rate. This clock (the motor-speed control clock), when combined with the direction command from the decision logic, steps up or down the bi-directional counter 96. The counter output, a digital number is fed into the address lines of the read-only memories 108, 110, 112 and 114. Since these memories are pre-recorded with the appropriate current profiles $I_A$, $I_B$, $I_C$ and $I_D$ (as functions of angle), the ROM output data at any instant represent the instantaneous values of the winding currents. In case of ROM 108, its output is converted into the analog voltage by the digital-to-analog converter 125. The output loop, which consists of the operational amplifier 140, the power amplifier 148, resistors 164, 172 and 132, drives current through the phase A motor winding 156. Since the voltage of the junction of resistors 164 and 172 is proportional to winding current, the distinct property of virtual ground of the op amp forces the motor current to be directly proportional to the digital-to-analog converter output. Based on current large-scale integration semiconductor technology, there could be implemented in a single microprocessor device all parts to the left of the digital-to-analog converters.

The operation of the above circuit will be generally understood from the aforegoing description. However, it will be useful to note that the variable modulus counter may operate to count the output of crystal oscillator 92 and will be controlled to have an output following the count of a certain designated number of cycles. This will, in effect, provide a motor-speed control clock along line 94.

Reference to FIG. 7 will show the details of the decision logic circuit 84. Therein it will be seen that the input command is received via line 82 and will indicate a new position to be assumed by the mechanical load which is being driven. This new position goes into a subtractor 400 which receives also information indicating the last or old position occupied by the load as indicated by counter 402. Counter 402 is connected to subtractor 400 via lines 404. The output of the subtractor is connected via lines 406 to a wrap-around combinational logic circuit 408. Outputs from the circuit 408 travel via line 410 to increment holding register 412 and via line 414 to flip-flop 416. A strobe signal passes via line 418 through the flip-flop 416 via line 420 and to the increment holding register 412 via line 422. Line 418 is also conncted to increments-to-go counter 424 which receives an input via line 426 from the wrap-around combinational logic circuit 408. An update signal travels via line 428 and lines 430 and 432 to the old position counter 402 and the counter 424.

The output of the counter 424 passes via line 434 to speed-selection combinational logic circuit 436 which receives another input circuit signal via lines 438. The flip-flop 416 puts out a directional signal via line 440. The outputs of speed-selection combinational logic circuit 436 are outputted via lines 440, 442, 444, 446, and 448. They represent V, 2V, 3V, 4V and 8V as will be hereinafter discussed.

The circuit illustrated in FIG. 7 is based on specific hardware involving a load of an I.B.M. golf-ball type printing head with 22 characters in each of a plurality of horizontal rows. The head constitutes a rotatable mechanical load. The motor employed was a 15° variable-reluctance stepping motor having 24 natural stop or detent positions.

As will be discussed hereinafter, FIGS. 8A–E show the desired field velocity profiles for all possible incremental motions. To achieve this, the decision logic illustrated in FIG. 7 operates as next discussed hereinbelow.

In FIG. 7 the old position counter 402 may be, for example, a 5 bit counter which is bi-directional. Its contents represents the motor shaft position. Counting clockwise, each position may be represented, for example, by a number from 0 to 21.

The subtractor 400 generates the difference between two digital numbers—one is the indication of the new or future or destination position and the other number is the old or last position indication. The difference can be represented by a six bit digital number which, for example, includes a sign (plus or minus). The wrap-around combinational logic circuit 408 simplifies the six bit number received from the subtractor 400. Since minus 21 means counterclockwise and thus indicates a counterclockwise motion of 21 positions, this can be altered to reduce the number of detent positions to be passed. In actual motion, it can be achieved by rotating the motor clockwise by one position. Therefore, all numbers outside of the range of −10 to +11 (thereby, with the 0, representing the 22 positions required for the printing head) are replaced in the wrap-around combinational logic circuit 408 by an equivalent number of opposite sign where this reduces the motion.

The flip-flop 420 is the directional flip-flop. This flip-flop stores the information of which direction the motion should turn in. It is set once for every incremental motion required.

The increment holding register 412 takes the output of the wrap-around combinational logic circuit 408 and stores the same during the entire motion time. The content of this register is the indication of the total positions to be advanced by the motor in either direction.

The increments-to-go counter 424 is initially loaded with the same number as in increment holding register 412. However, as the motor turns, a signal fed back from the variable modulus counter 88 in FIG. 6 increments this counter as the motor shaft completes each step. Thus, this counter represents the actual steps which have not yet been completed.

With respect to the speed-selection combinational logic circuit 436 as the necessary information is received from increment holding register 412 and increments-to-go counter 424, there can readily be generated five signals V, 2V, 3V, 4V, and 8V. For example, it total movement is to be five steps and the motor has just completed the second step, from FIG. 8, it can be seen that the third step should have a velocity of 8V which is eight times as fast as the fundamental reference speed V. Therefore, the signal 8V should be activated at this time.

FIG. 6 furthermore includes the current patterns or curves which are fed to the windings of the various phases and which are retained in memories 108, 110, 112, and 114. How these current patterns or curves are developed will be discussed hereinafter.

Referring now to FIG. 5A-1 and FIG. 5A-2 which denote one-step acceleration and deceleration, it is seen that the abscissa 200, 216 are measured in time units whereas the ordinates 202, 218 are measured in degrees of angle and degrees of angle per second respectively. It will be noted that the entire motion time is divided into three periods, i.e., acceleration, constant velocity and deceleration.

During acceleration, the field advances at a constant velocity $\omega_2$ as indicated by 220 and the rotor position 204 lags behind the field position 206. At the beginning of this period the rotor advances at a speed 222 slower than the field speed 220. However, as midpoint 224 is passed, the rotor speed 226 exceeds the field speed 220 but at this time the rotor is still being accelerated because its position 204 is still behind the field position 206. This condition holds until, at the end of this period 228, the rotor position catches up with the field position and at this instant the rotor speed is precisely $2\omega_2$ which is twice as fast as the field speed. From here on, the constant velocity slew period begins.

During the constant velocity period, the field velocity is switched to $2\omega_2$ so that the rotor and the field advance in synchronization as indicated by the position curve 208 and the velocity curve 230.

At the beginning of the deceleration period, the field velocity is switched from $2\omega_2$ to $\omega_2$ as indicated by 232 so that the rotor position 210 overshoots the field position 209. Since the rotor constantly sees the attractive force from behind, it starts to slow down as shown in 212. Passing midpoint 234, the rotor speed 236 is less than the field speed $\omega_2$ but deceleration continues as the rotor position 210 is still ahead of the field position 209. This condition holds until the rotor stops at the end of the deceleration period 238. It should be particularly noted here that, at the very instant the rotor stops, the field position coincides with the rotor. Thus, the motion of the field should be stopped at the same instant so that there will be no further rotor motion and a hunting-free incremental motion is accomplished.

Curves 5A-1 and 5A-2 show the patterns satisfactory for use in relation to FIGS. 8A, 8B, 8C, 8D and 8E. However, in FIGS. 8A, 8B, 8C, and 8D there is no constant velocity slew period so that the entire motion time consists of two periods, one for acceleration and one for deceleration.

The limitation of the one-step acceleration and deceleration control scheme lies in the fact that the rotor speed cannot change excessively during half a resonant period. In other words, the field speed during acceleration $\omega_2$ must satisfy Inequality (4A) which becomes, in this case, $|\omega_2| < \Omega_o$ where $\Omega_o$ is the resonant angular velocity of the rotor, i.e. $\Omega_o = 2\pi/T$ where T is the measured period of resonance.

If very high rotor speed is desired, a multi-step acceleration and deceleration control scheme can be employed. In essence, this scheme accelerates and decelerates the rotor gradually, one step at a time so that Inequality (4A) is always satisfied. A two-step acceleration and deceleration incremental motion is shown in FIGS. 5B-1 and 5B-2. Note that during first acceleration period the field speed 250 is $\omega_a$, the rotor reaches $2\omega_a$ at the end of this period. During the second acceleration period, the field speed is switched to $\omega_a + \omega_b$ as indicated by 252. The rotor then is further accelerated to the speed of $2(\omega_a + \omega_b) - 2\omega_a = 2\omega_b$ (Eq. (7)). The deceleration is accomplished in similar fashion but in reverse order.

Referring again to FIGS. 5B-1 and 5B-2, FIG. 5B-2 shows the two-step acceleration in the form of constant acceleration magnitude 250 and 252 before constant magnitude for maximum velocity is achieved by both the field and the rotor as indicated at 254. Deceleration is shown in the two steps indicated at 256 and 258 with the rotor and field simultaneously achieving standstill as indicated at 260. In all of the steps, it will be noted that the curves cross midway during the periods of acceleration and deceleration so that synchronization is achieved at maximum velocity and so that appropriate standstill without oscillation or hunting is achieved as indicated at 260 in FIG. 5B-2.

It remains to demonstrate that given any 4-phase PM or VR stepping motor there exists an unique current profile $I(\theta)$ such that if we put $\theta = \omega t$ and let $I_A(t) = I(\omega t)$ be the driving current for phase A
$I_B(t) = I(\omega t - \pi/2)$ be the driving current for phase B
$I_C(t) = I(\omega t - \pi)$ be the driving current for phase C
$I_D(t) = I(\omega t - 3\pi/2)$ be the driving current for phase D then a uniform strength revolving field with constant velocity $2\omega/\pi$ (mechanical steps per second) is generated.

The shape of $I(\theta)$ is difficult to predict because the torque-current relationship becomes very complicated as the ferromagnetic material is driven into the saturation region. However, $I(\theta)$ can be easily obtained empirically in accordance with the following:

Step (1) Drive phase A winding with maximum running current and open circuit phases B.C.D. Measure rotor stiffness and record detent position.

Step (2) Put a small arbitrary amount of current thru phase B and reduce phase A current by a small, but not necessary equal, arbitrary amount. At this time, the rotor detent position will be Δθ (at most 5–10% of one complete step) away from its original position.

Step (3) Adjust current in both windings until the stiffness is equal to that in step 1, in the meantime the shift in detent position Δθ should be kept unchanged. Record winding currents $I_A(\Delta\theta)$ and $I_B(\Delta\theta)$.

Step (4) Repeat steps 2 and 3 for new detent position shifts 2Δθ, 3Δθ ... etc. until $I_A = I_A$. At this time the rotor should be half a step away from its original position. (FIG. 9A).

Step (5) Construct I (θ) first by linking $I_A(\theta)$ and $I_{LB}(\theta)$ and then extending the resultant curve in mirror image fashion. (FIG. 9B).

In the above, reference has been made to "rotor stiffness". This involves a measurement in, for example, inch-ounces per mechanical degree to pull over an operating range of 0 to 0.7 of a complete step in a stepping motor.

Figure 9A:
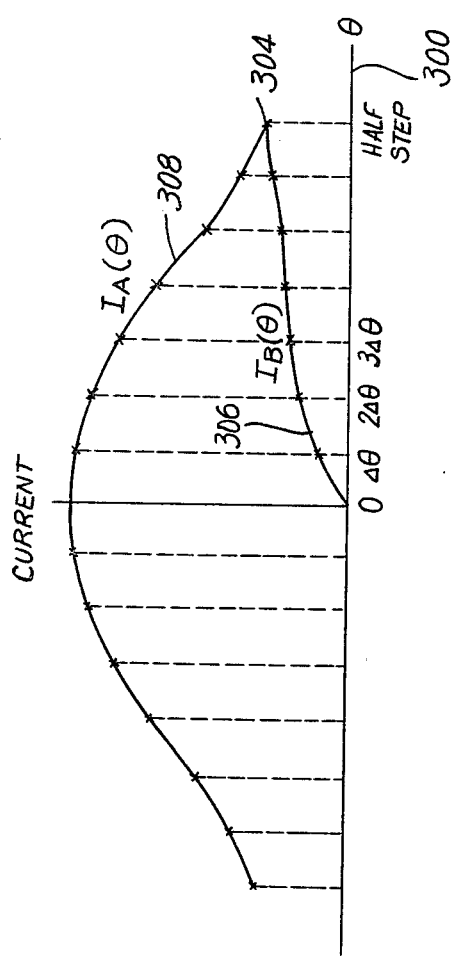
FIG. 9A is a chart illustrating the method of deriving current patterns or curves in accordance with the invention.

Referring to FIG. 9A, it is seen that the abscissa 300 is indicated in degrees whereas the ordinate 302 is measured in units of current. At each of the steps, two measurements are made commencing with a current in the B phase with a maximum running current in phase A. Eventually the two curves cross as indicated at 304 and the measurements can then be terminated for, as indicated by way of example in FIG. 9B, the curve 306 in FIG. 9A can be used in mirror image form as indicated at 306' in FIG. 9B to complete curve 308 from FIG. 9A. Thus, the curve consisting of portions 308 and 306' can be used in mirror image form around the ordinate 302 to form the remaining portion 310 whereby the entire curve is achieved for the cooperating phases A and B. The total use of the phases is indicated in the top portion of FIG. 6 wherein it is seen that each of these current patterns or curves, which are bell-shaped, is stored in memories 408, 410, 412 and 414 for selection according to the command input. Speed is controlled by appropriate operation of the variable modulus counter 88 as discussed hereinabove.

Figure 10:
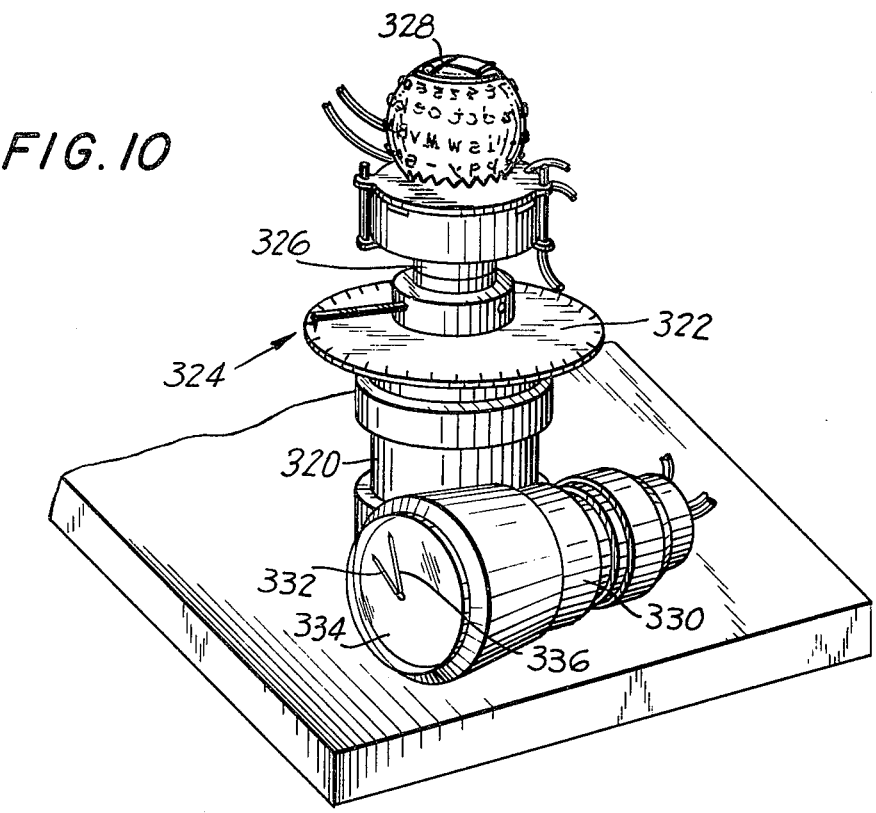
FIG. 10 illustrates perspectively and diagrammatically the apparatus involved in obtaining the data chartered in FIGS. 9A and 9B.
Figure 9B:
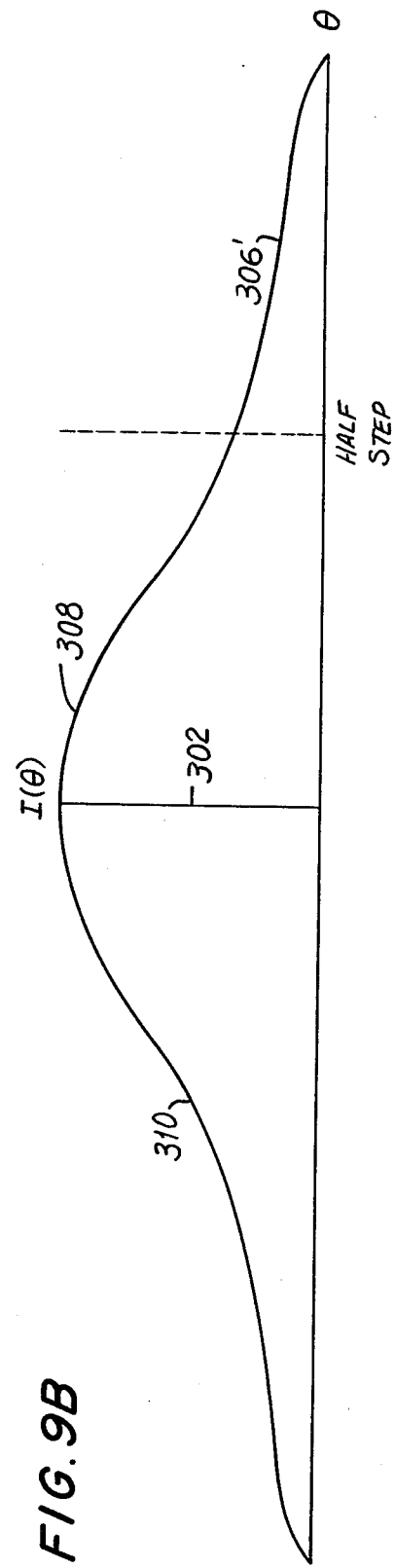
FIG. 9B is a chart converting the results of FIG. 9A into a full current curve for a phase of a stepping motor.

The general technique by which the measurements necessary to FIGS. 9A and 9B are made may be practiced with the apparatus as illustrated in FIG. 10. Therein appears the stepping motor 320 on which is mounted dial 322 with pointer 324 being affixed to the shaft 326 of the motor. Whereas the golf-ball mechanical load 328 may be driven by the motor, for measurements this is removed and replaced by the torque watch device 330 having a stationary needle 332 mounted on dial 334 and a moving needle 336 whereby the aforegoing measurements can be taken to form the curves illustrated in FIGS. 9A and 9B.

From what has been stated hereinabove, it will now be apparent that the invention includes as one aspect thereof the provision of a method comprising establishing, for the interaction between magnetically coupled driving and driven members, a plurality of magnetic field patterns for the driving member which will define positions for the driven member at which positions the driving member will be in equilibrium, and storing indicia of the field patterns for subsequent application of said field patterns to the driving member to drive the driven member, said driving members including windings, said method comprising, for establishing said patterns and storing said indicia, determining current patterns to be supplied to said windings to produce said magnetic field patterns, and recording said patterns.

In the above, said driving and driven means may be respectively a stator and rotor and said windings will be arranged to generate cooperatively said magnetic field patterns. The method will comprise balancing the currents in the windings to produce the said magnetic field patterns.

Furthermore, the invention will comprise the method whereby the currents in the windings are balanced to provide a constant rotor stiffness at all positions and such that at equal displacements from said positions, equal restoring torques will be applied to the rotor.

According to yet another aspect, the invention provides a method wherein there is established, for the interaction between magnetically coupled driving and driven members, a plurality of magnetic field patterns for the driving members which will define positions for the driven member at which positions the driving member will be in equilibrium, and storing indicia of the field patterns for subsequent application of said field patterns to the driving member to drive the driven member, said method comprising, for establishing said patterns and storing said indicia, determining said magnetic field patterns by displacing said driven member incrementally relative to said driving member through a plurality of positions at each of which adjustments are made to the magnetic interaction between the driving and driven members to obtain equilibrium of the driven member and storing indicia of how equilibrium was obtained.

The aforesaid equilibrium is ascertained with a constant stiffness of the driven member. The magnetic interaction is preferably effected by passing currents through windings and the method further comprises adjusting the magnitudes of the currents to obtain equilibrium and the constant stiffness and storing the thusly obtained current magnitudes.

In the case where the driven member has detent positions relative to the driving member, the method will comprise incrementally displacing said driven member by no more than about 10% of the distance between said detent positions at a time to define the positions for which the magnetic field patterns are determined.

There will now be obvious to those skilled in the art many modifications and variations of the techniques, methods and apparatus set forth hereinabove. These modifications and variations will not depart from the scope of the invention if defined by the following claims in which reference to a rotor or the equivalent shall be construed in the absence of conflicting definition to mean the rotor inclusive of the load thereon.

What is claimed is:

1. A method of establishing current forms for windings of a multi-phase stepping motor, having a rotor and characterized by a plurality of detent positions, to provide a uniform revolving field, said windings being operative in sequentially effective pairs to control the rotor of the motor, said method comprising, for each of said pairs, driving one winding of the pair with maximum running current and measuring rotor stiffness at the resultant detent position, next passing a relatively small current through the other winding of the pair and reducing the current through said one winding to displace said rotor a relatively small fraction of the distance towards the next detent position, adjusting the latter two said currents to obtain a rotor stiffness equal to the first said rotor stiffness while maintaining rotor position, and sequentially displacing the rotor in steps towards the next detent position by passing the currents through the windings of the pair while adjusting the currents to maintain rotor position and stiffness, the magnitudes of the thusly adjusted current defining current curves for the windings to provide a uniform revolving field.

2. Apparatus comprising a stepping motor including a stator, a rotor and windings on said stator to drive said rotor through a plurality of detent positions; a storage means to store current patterns to provide currents to said windings to generate a revolving field to displace said rotor from standstill at a first of said detent positions to standstill at a second of said detent positions at constant velocity and with uniform field strength between accelerating and decelerating periods, said storage means storing current patterns for providing currents to said windings during the acceleration period to bring the rotor and revolving field to corresponding velocities in synchronization and for providing currents to said windings during the deceleration period to bring the rotor and revolving field to a standstill simultaneously with the rotor at said second detent position; and selection means for selecting the patterns for the driving of the rotor; said patterns being formed as claimed to claim 1.

3. A method as claimed in claim 1 comprising discontinuing displacement of the rotor and adjustment of the currents in the windings of the pair when the adjusted currents are equal to each other and forming curves of the adjusted current magnitudes with each curve being continued with the mirror image of the other curve.

4. A method as claimed in claim 3 wherein rotor stiffness is determined by measuring the average torque/displacement ratio over a selected range of the rotor displacement, from its detent positions.

5. A method as claimed in claim 4 wherein said fraction is no more than about ten percent of the distance between detent positions.

6. Apparatus comprising a stepping motor including a stator, a rotor and windings on said stator to drive said rotor through a plurality of detent positions; a storage means to store current patterns to provide currents to said windings to generate a revolving field to displace said rotor from standstill at a first of said detent positions at constant velocity and with uniform field strength between accelerating and decelerating periods, said storage means storing current patterns for providing currents to said windings during the acceleration period to bring the rotor and revolving field to corresponding velocities in synchronization and for providing currents to said windings during the deceleration period to bring the rotor and revolving field to a standstill simultaneously with the rotor at said second detent position; and selection means for selecting the patterns for the driving of the rotor; said patterns being formed as claimed in claim 4.

7. Apparatus comprising a stepping motor including a stator, a rotor and windings on said stator to drive said rotor through a plurality of detent positions; a storage means to store current patterns to provide currents to said windings to generate a revolving field at a piecewise constant velocity to displace said rotor from standstill at a first of said detent positions to standstill at a second of said detent positions, said storage means storing current patterns for providing currents to said windings during the acceleration period to bring the rotor and revolving field to corresponding velocities in synchronization and for providing currents to said windings during the deceleration period to bring the rotor and revolving field to a standstill simultaneously with the rotor at said second detent position; and selection means for selecting the patterns for the driving of the rotor.

8. Apparatus as claimed in claim 7 wherein the storage means includes a memory for each of said windings, said memories storing said current patterns.

9. Apparatus as claimed in claim 8 wherein said selection means comprises means for generating addresses to release selected patterns from said memories.

10. Apparatus as claimed in claim 9 wherein said selection means includes a variable clock generator and a counter coupled to said clock generator for generating addresses.

11. Apparatus as claimed in claim 10 wherein said selection means includes a first position indicator for indicating rotor position last occupied a second position indicator for indicating rotor position desired and subtractor means coupled to said indicators for indicating the number of detent positions between last occupied and desired rotor positions.

12. Apparatus as claimed in claim 11 comprising a rotary load coupled to said rotor and wherein said selection means includes wrap-around combinational logic means coupled to said subtractor means to calculate the minimum number of detent positions between the last occupied and desired rotor positions.

13. Apparatus as claimed in claim 12 wherein said selection means includes speed-selection logic means responsive to said subtractor means and a set of preprogrammed velocity profiles to provide proper input signals for said variable clock generator.

14. A method comprising establishing, for the interaction between magnetically coupled driving and driven members, a plurality of magnetic field patterns for the driving member which will define positions for the driven member at which positions the driven member will be in equilibrium, and storing indicia of the field patterns for subsequent application of said field patterns to the driving member to drive the driven member, said driving members including windings, said method comprising, for establishing said patterns and storing said indicia, determining current patterns to be supplied to said windings to produce said magnetic field patterns, and recording said patterns.

15. A method as claimed in claim 14, wherein said driving and driven members are respectively a stator and rotor and said windings are arranged to generate cooperatively said magnetic field patterns, comprising balancing the currents in the windings to produce said magnetic field patterns.

16. A method as claimed in claim 15 comprising balancing the currents in the windings to provide a constant rotor stiffness at all positions and such that, at equal displacements from said positions, equal restoring torques will be applied to the rotor.

17. A method comprising establishing, for the interaction between magnetically coupled driving and driven members, a plurality of magnetic field patterns for the driving member which will define positions for the driven member at which positions the driven member will be in equilibrium, and storing indicia of the field patterns for subsequent application of said field patterns to the driving member to drive the driven member, said method comprising, for establishing said patterns and storing said indicia, determining said magnetic field patterns by displacing said driven member incrementally relative to said driving member through a plurality of positions at each of which adjustments are made to the magnetic interaction between the driving and driven members to obtain equilibrium of the driven member and storing indicia of how equilibrium was obtained.

18. A method as claimed in claim 17 wherein equilibrium is ascertained with a constant stiffness of the driven member.

19. A method as claimed in claim 18, wherein the magnetic interaction is effected by passing currents through windings, comprising adjusting the magnitudes of the currents to obtain equilibrium and the constant stiffness, and storing the thusly obtained current magnitudes.

20. A method as claimed in claim 17, wherein the driven member has detent positions relative to the driving member, comprising incrementally displacing said driven member by no more than about ten percent of the distance between said detent positions at a time to define the positions for which the magnetic field patterns are determined.

* * * * *